United States Patent
Bianchi

(10) Patent No.: US 8,388,332 B2
(45) Date of Patent: Mar. 5, 2013

(54) MOLD, DEVICE AND METHOD FOR PRODUCING MOLDED SKINS AND MOLDED BODIES MADE OF PLASTIC

(75) Inventor: Willi Bianchi, Lüneburg (DE)

(73) Assignee: Peguform GmbH, Bötzingen (DE)

( * ) Notice: Subject to any disclaimer, the term of this patent is extended or adjusted under 35 U.S.C. 154(b) by 531 days.

(21) Appl. No.: 12/595,816

(22) PCT Filed: Apr. 14, 2008

(86) PCT No.: PCT/EP2008/002928
§ 371 (c)(1),
(2), (4) Date: Oct. 13, 2009

(87) PCT Pub. No.: WO2008/131855
PCT Pub. Date: Nov. 6, 2008

(65) Prior Publication Data
US 2011/0309549 A1    Dec. 22, 2011

(30) Foreign Application Priority Data
Apr. 25, 2007    (DE) .......................... 10 2007 019 862

(51) Int. Cl.
*B29C 41/38* (2006.01)
*B29C 41/46* (2006.01)

(52) U.S. Cl. .......... 425/182; 249/79; 425/429; 425/435; 425/470

(58) Field of Classification Search ................. 425/182, 425/429, 435, 425, 470; 249/79
See application file for complete search history.

(56) References Cited

U.S. PATENT DOCUMENTS

| | | | | |
|---|---|---|---|---|
| 3,173,175 A | * | 3/1965 | Lemelson | 425/435 |
| 3,454,988 A | * | 7/1969 | Cremer | 425/435 |
| 3,753,830 A | * | 8/1973 | Cruckshank et al. | 425/388 |
| 4,063,705 A | * | 12/1977 | Vodra | 249/80 |
| 4,217,325 A | * | 8/1980 | Colby | 264/245 |
| 4,295,628 A | * | 10/1981 | Kupf et al. | 249/80 |
| 4,683,098 A | | 7/1987 | Belleville et al. | |
| 4,725,034 A | * | 2/1988 | Ando et al. | 249/80 |
| 4,867,660 A | * | 9/1989 | Nagase et al. | 425/435 |
| 5,106,285 A | | 4/1992 | Preston | |
| 5,221,539 A | * | 6/1993 | Pallerberg et al. | 425/435 |
| 2001/0020757 A1 | | 9/2001 | Fried et al. | |
| 2005/0064060 A1 | * | 3/2005 | Wagner et al. | 425/435 |

FOREIGN PATENT DOCUMENTS

| | | |
|---|---|---|
| DE | 28 17 030 A1 | 10/1978 |
| DE | 41 06 964 A1 | 9/1992 |
| DE | 199 22 164 A1 | 11/2000 |
| DE | 102 21 478 A1 | 11/2003 |
| DE | 103 27 630 B3 | 12/2004 |
| JP | 60 178014 A | 9/1985 |
| JP | 62 227610 A | 10/1987 |
| WO | WO 03/097318 | 11/2003 |

* cited by examiner

*Primary Examiner* — James Mackey
(74) *Attorney, Agent, or Firm* — Henry M. Feiereisen, LLC

(57) ABSTRACT

The present invention refers to a mold for the production of molded skins 7 and molded bodies 7 from plastic, wherein the mold is configured as a double-walled hollow body comprising a shaped front wall 1 as well as a rear wall 2, in which hollow chambers are formed. With this arrangement, it is possible to save energy and also not inconsiderable amounts of material when applying a slush-or rotation method for the production of molded skins 7 and molded bodies 7 especially those for use in interior paneling and dash boards of motor vehicles.

8 Claims, 2 Drawing Sheets

MOLD, DEVICE AND METHOD FOR PRODUCING MOLDED SKINS AND MOLDED BODIES MADE OF PLASTIC

BACKGROUND OF THE INVENTION

The present invention refers to a mold for the production of molded skins and molded forms of plastic according to the preamble of claim 1 as well as a device and a method for the production of molded skins and molded bodies from plastic.

Methods for the production of molded skins or molded parts are known under the term rotational casting, rotational sintering or slush casting. In those methods molds are being filled with pourable or also liquid plastic, which is then melted by supplying heat, such that, at the surface of the mold, a thin plastic layer forms. The excess plastic material can subsequently be discarded, before, for example, through further heating, material deposition or a chemical change can take place. After cooling the mold, the completed molded body or the mold skin is taken form the mold. Normally, filling the pourable plastic material into the mold in the form of a powder or granulate is done by means of placing or docking a so-called powder box at the mold with its opening directed downward, and then rotated together with the powder box, such that the plastic powder or granulate falls in the mold and is processed in the above-described manner.

The heat supply can be carried out by means of moving the mold into a hot air chamber. This has however the disadvantage that the heating and cooling of the mold takes a long time, so that the success with the conventional type method is not very high. In addition, when utilizing hot air chambers-or furnaces, the process control, in particular the temperature monitoring is unsatisfactory.

Methods are known that are able to accelerate the production of plastic skins or mold forms by utilizing double-walled molds which are filled with a cooling-or heating medium.

Thus, in DE 41 06 964 C2, a device for the production of molded skins and molded bodies from plastic are described, where a double-walled galvano mold its utilized, which is configured with a multitude of inlet and outlet openings at the rear wall for the heating-and cooling medium, by means of which a fast heating and cooling across the entire surface of the mold is realized. The inlet openings are not necessarily distributed evenly, but in particular embodiments concentration of the heating and cooling medium supply at certain locations is contemplated, which are primarily used to even out differences in the wall thickness in the mold wall that cannot be avoided during production of the mold by galvanic method.

Although, in this manner, varying wall thicknesses can also be realized, yet for a specific production of varying thicknesses in the molded skin, this method is only partially suitable, since on the one hand, the expenditure of the apparatus is very high, and on the other hand the temperature differences on the mold wall are relatively small while at the same time the temperature transitions are undefined and blurry, so that the method is not suitable to realize specific ranges with a lower or higher wall thickness.

With molded skins that are produced by slush casting for the production of instrument dash boards of motor vehicles, the requirements for the wall thickness of the molded skin differs depending on which area is to be covered by the molded skin. Thus, in the air bag area, a molded skin thickness of approximately 1.2 mm is desired, while in the remaining area a thickness of 0.9 mm suffices, which represents a not insignificant potential for material savings if it were possible to realize the varying wall thicknesses.

In the area of the instruments, openings are provided which have to be made in the completed molded skin with an additional work step, which causes, aside from extra work, additional loss of material due to material waste.

Methods are known which can influence the wall thickness of the molded skin or molded bodies through respective control of the cooling- or heating medium or differing heating or oil circulations and thereby their configuration.

Thus, from DE 28 17 030 A1, a method for the production of molded skins is known, where the mold exhibits different areas with different fluid passages with which the production of varying wall thicknesses can be realized. This method has the drawback that it has an enormous apparatus requirement.

There is then still a further demand for a method or a device for the production of molded skins with varying wall thicknesses or even complete recesses in a simple manner.

SUMMARY OF THE INVENTION

This object is solved by means of a method for the production of molded skins and bodies from plastic for interior paneling and instrument dash boards of motor vehicles by attaching a box for a mold which contains plastic in the form of powder, granulate or liquid onto the mold and rotating the box with the mold to transfer the plastic material from the box to the mold, depositing the plastic material onto the inner profile of the mold, by reverse rotating of the mold and the box, after attaining the desired wall thickness, collecting the excess plastic material in the box and removing the molded skin of body from the mold, wherein the temperature profile for the heating- and cooling medium are program-controlled.

It is a further object of the present invention is to provide a mold by means of which a molded skin can be produced with varying wall thicknesses or recesses in a simple manner such that the mold for the production of molded skins and molded bodies from plastic, in particular, for interior paneling and instrument dashboards for motor vehicles includes a double-walled hollow body, a form giving shaped inner profile, and a shaped front surface, a rear wall as well as a lateral sealing for the space between the front wall and the rear wall, wherein the hollow body is configured for the supply and discharge of a heating- and cooling medium, wherein the front wall and/or the rear wall have at least one hollow chamber.

It is also an object of the invention to provide a mold by means of which the production of molded skins or molded bodies can be speeded up and at the same time achieve savings in energy. This object is likewise solved by a mold with the features as afore-described.

Advantageous embodiments of the mold according to the invention are reflected in the dependent claims.

Starting from a double-walled mold configured for the supply of a heating- and cooling medium and having a shaped front wall, a rear wall and a lateral sealing between front wall and rear wall, it has been found that by purposefully placing hollow chambers in the front wall, the heat transport from heating-or cooling medium to the shaped inner profile of the front wall can be influenced to such an extent that the deposit of a plastic skin at the respective location at the front wall is limited or completely suppressed. The hollow chamber acts thereby as insulation and prevents a heat transfer from the heating- or cooling medium to the inner profile of the front wall.

Hollow chambers in the rear wall of the mold also have an insulating effect and protect from heat loss during the production process which is accelerated through the utilization the hollow chambers in the rear wall and therefore requires less energy.

The formation of the hollow bodies is dependent on the type of mold. For example, in a welded mold, the hollow chamber can be soldered or welded onto the wall, while a wall that is galvanically produced, the hollow chamber forms itself directly during galvanizing, wherein a first deposited galvanic layer, in the areas where the hollow chambers are to be formed, are coated with wax, such that at these locations, upon further galvanization, a double-sided wall is formed with a wax encapsulation. After completion of the wall, the chamber is opened and the wax can be removed through melting.

Since the rear side of the front wall of the mold is in contact with the heating- or cooling medium while the plastic skin is deposited at the front surface, it is necessary to configure the hollow chamber, in the area of the front wall, closed and able to be evacuated, to prevent, in this manner, penetration of the heating- or cooling medium into the chamber and at the same time prevent a gas expansion in the closed chamber.

The formation of one or more hollow chambers at the rear wall of the hollow mold effects an insulation of the cooling- or heating medium relative to the outer wall and serves exclusively the reduction of energy, as well as the acceleration of the production process. Since only the front surface of the rear wall facing the interior is coming into contact with the medium, the hollow chambers in the rear wall are not closed, but have an opening at the side facing away from the heating- and cooling medium.

The lateral sealing between the front- and rear wall is advantageously formed by a type of support frame, which holds the front wall and the rear wall together.

The mold which is configured as a double walled hollow body has at least an inlet-and outlet opening each for the heating- and cooling medium, which in turn is connected to the heating-and cooling medium.

Object of the present invention is also a device for the production of molded skins and molded bodies from plastic, in which a mold is configured as a double-walled hollow body, wherein the front- and/or rear wall of the mold is provided with at least one hollow chamber. Besides this mold, the device comprises a box for placing on top of the mold and containing plastic material in powdered, granulated or liquid form, a rotation frame connected to the support frame of the mold and with which the mold is rotated in the device, as well as a program control to setting a temperature profile.

Object of the invention is also a method for the production of molded skins and molded bodies from plastic, wherein first, a box placed on top of the mold containing powdered-granulated or liquid plastic material, is attached at the mold which is configured as a double walled hollow body whose front wall and/or rear wall has at least one hollow chamber. Subsequently, the box with the mold is rotated in the mold for pouring the plastic material from the box into the mold, and as soon as the material is placed in the mold, a plastic skin is deposited at the inner profile of the mold by means of a corresponding temperature program which is adjusted through a heating medium, preferably oil. The subsequent solidification of the mold skin or the molded body can be accelerated by means of a suitable cooling medium. Advantageously, the heating-and cooling medium is circulated and is in fluid connection with the double-walled hollow body via corresponding inlet-and outlet openings, as well as supply- and discharge systems.

A preferred embodiment of the present invention provides that the formgiving shaped front wall is replaceably attached at the rear wall such that through simple exchange of the front wall, production of different molded skins can be realized with the same device.

BRIEF DESCRIPTION OF THE DRAWING

In the following paragraphs, the present invention will be described in more detail by means of drawings, which show.

DETAILED DESCRIPTION OF PREFERRED EMBODIMENTS

Figure 1:
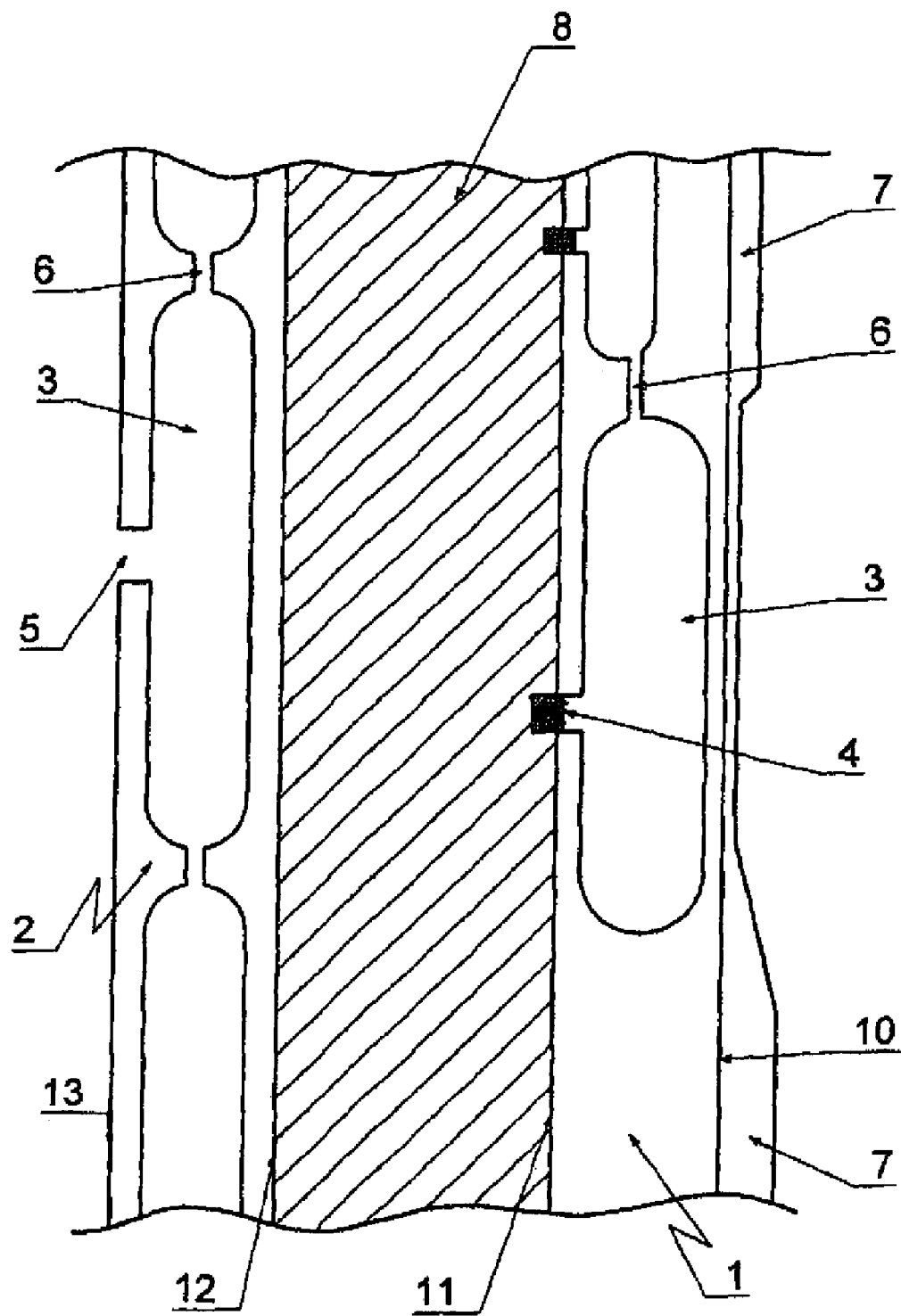
FIG. 1 a top view of a cross section through the front wall and rear wall of the double-walled hollow body and
FIG. 2 a top view of a longitudinal section through a front wall or rear wail.

The cross section of the double-walled hollow body in FIG. 1 shows a detail of a front wall 1 provided with two hollow chambers 3, wherein the hollow chambers 3 exhibit a different thickness and the distance to the shaped side 10 of the front wall 1 varies. This configuration of the hollow chambers 3 results, during the production process, in varying layer thicknesses of the plastic layer 7, since each of the areas of the shaped front surface 10 exhibit different temperatures. Thus, in the area of the front surface 10, where there is no hollow chamber 3, the temperature is transmitted directly, so that at this point, a lot of plastic material is being melted and a correspondingly thick molded skin 7 is being formed.

The hollow chamber 3 in FIG. 1 having the larger diameter almost extends to the shaped front surface 10 of front wall 1, thereby realizing a correspondingly good insulation, so that at this location, the plastic skin 7 forms only a very thin layer. In a further development of this configuration, and depending on the melting point of the plastic material utilized, a deposit of material can be entirely prevented. Accordingly, especially in the galvanic production of mold wall 1, 2, it is possible to develop the hollow chamber 3 close to the outer surfaces 10, 13 of wall 1, 2, such that in the case of front wall 1, an optimal insulation prevents the deposition of plastic skin 7 at this location.

In the area of hollow chamber 3 with the lesser diameter, the insulation is not so pronounced and the molded skin 7 in this area forms a layer of average thickness. In the embodiment as shown in FIG. 1, each single hollow chamber 3 is connected with connection channels 6 to a hollow chamber system, which has the advantage that not each single hollow chambers 3 need be provided with an evacuating stopper 4 or an opening for gas 5. As is seen in FIG. 1, at the rear surface 11 of the front wall 1, which comes into contact with the cooling- or heating medium 8, the opening of hollow chamber 3 is closed with evacuation stopper 4 in order to prevent penetration of the cooling- or heating medium. An evacuation in the area of the front wall 1 is required in order to prevent a destruction of the front wall 1 through expansion of heated gas.

In the rear wall 2, the hollow chambers 3 serve exclusively for insulation and thus energy savings and the acceleration of the production process. Therefore, the hollow chambers 3 can be configured uniformly. Also, the openings 5 of hollow chambers 3 can be configured open since they are arranged at the outer area of the double-walled molds and do not come in contact with the cooling- or heating medium 8.

Figure 2:
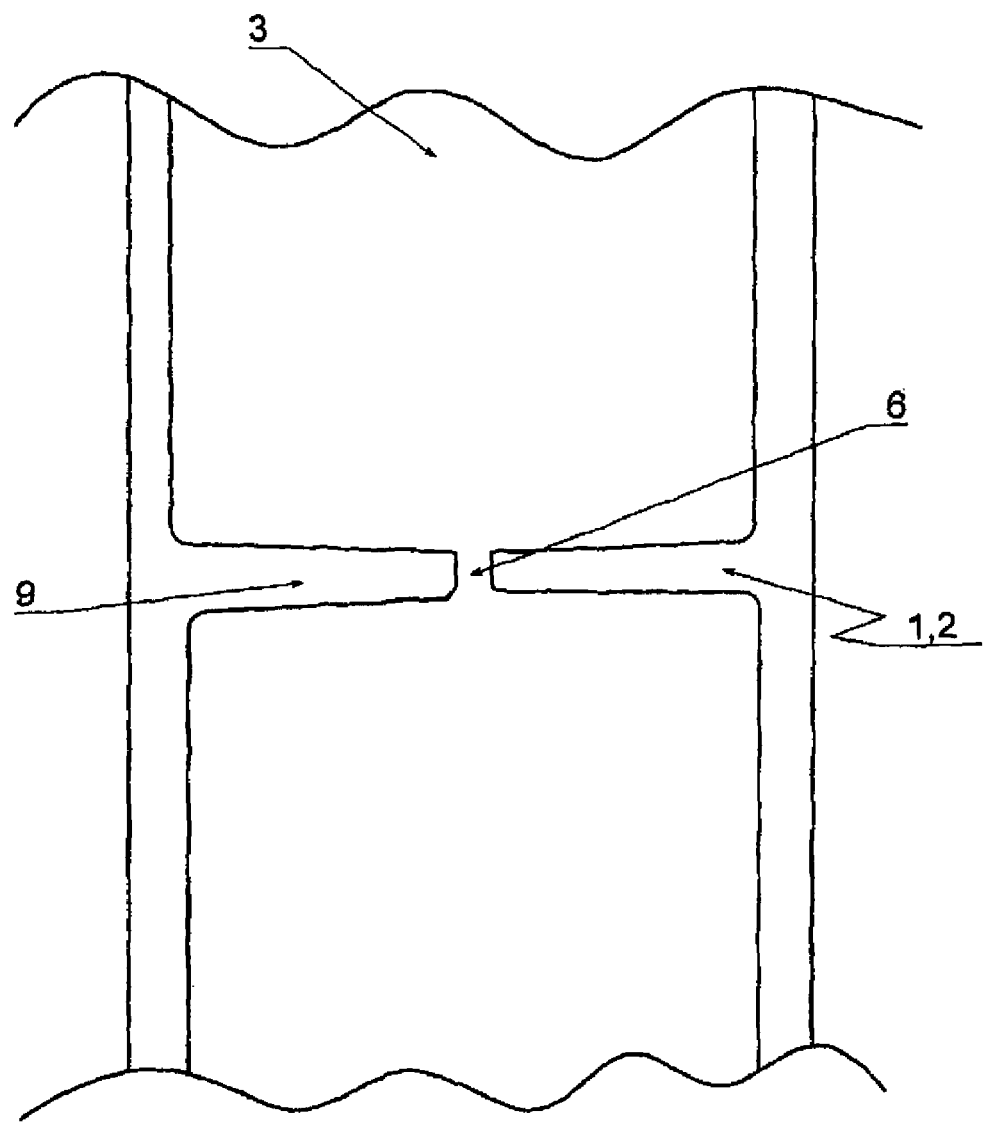

FIG. 2 shows a longitudinal section through a front wall 1 or rear wall 2 of a mold for the production of molded skins or molded bodies in a top view, wherein two hollow chambers 3 are seen, which are connected with each other through a connection channel 6.

The embodiment as illustrated in FIG. 1 and FIG. 2 with each of the hollow chambers 3 connected to each other via connection channels 6, has the advantage that the walls of the molds by the thereby formed webs 9 between the hollow chambers are being stabilized such that compression of the hollow space, for example when heating, is avoided. Embodiments with single, smaller or larger hollow bodies serve the same purpose; however, in such cases it is of course required that each single chamber has a respective outlet opening, which, in case of the rear wall 2, is open, or is provided with an evacuation stopper 4 at the front wall 1.

With welded molds, it is conceivable that each of the walls is itself entirely or partially formed as double walls and simply stabilized by webs.

What is claimed is:

1. A mold for the production of molded skins and molded bodies from plastic, for interior paneling and instrument dashboards for motor vehicles, comprising a double-walled hollow body with a shaped inner profile, having a form giving front wall, a rear wall and a lateral seal for sealing the space between the front wall and the rear wall, wherein the hollow body is configured with inlet and outlet openings for supply and discharge of heating and cooling medium from a correspondingly connected supply and discharge system, wherein at least one of, the front wall and the rear wall contain at least one hollow chamber, said hollow chamber acting as a selective insulator relative to the heat transfer from the heating and cooling medium to the shape-producing front wall, to thereby control a temperature condition.

2. The mold according to claim 1, wherein the front wall and the rear wall are galvanically produced.

3. The mold according to claim 1, wherein, the mold is one of, a forged mold, a welded mold or a soldered mold.

4. The mold according to claim 1, wherein the at least one hollow chamber in the front wall is configured for evacuation.

5. The mold according to claim 1, wherein, the at least one hollow chamber in the rear wall is provided with an opening at a side facing away from the heating- and cooling medium.

6. The mold according to claim 1, wherein the form giving front wall is exchangeable.

7. The mold according to claim 1, wherein the hollow chamber located in at least the front wall is oriented in variable proximity to the front surface of the form giving front wall.

8. The mold according to claim 1, wherein the hollow chambers are of variable size.

* * * * *